(12) United States Patent
Amae

(10) Patent No.: US 8,761,428 B2
(45) Date of Patent: *Jun. 24, 2014

(54) REVERSIBLE BEHIND-THE-HEAD MOUNTED PERSONAL AUDIO SET WITH PIVOTING EARPHONE

(75) Inventor: Dominic Amae, Vancouver, WA (US)

(73) Assignee: Logitech Europe S.A., Lausanne (CH)

( * ) Notice: Subject to any disclaimer, the term of this patent is extended or adjusted under 35 U.S.C. 154(b) by 114 days.

This patent is subject to a terminal disclaimer.

(21) Appl. No.: 13/082,359

(22) Filed: Apr. 7, 2011

(65) Prior Publication Data

US 2012/0082333 A1 Apr. 5, 2012

Related U.S. Application Data

(63) Continuation of application No. 12/168,768, filed on Jul. 7, 2008, now Pat. No. 7,940,924, which is a continuation of application No. 11/357,933, filed on Feb. 16, 2006, now Pat. No. 7,406,172.

(60) Provisional application No. 60/653,712, filed on Feb. 16, 2005.

(51) Int. Cl.
H04R 25/00 (2006.01)
(52) U.S. Cl.
USPC .......................................... 381/378; 381/379
(58) Field of Classification Search
USPC .................... 381/374–381; 379/430
See application file for complete search history.

(56) References Cited

U.S. PATENT DOCUMENTS

| | | | |
|---|---|---|---|
| 3,792,754 A | 2/1974 | Hanson | |
| 3,862,379 A | 1/1975 | Pless | |
| 5,117,464 A | 5/1992 | Jones et al. | |
| 5,457,751 A | 10/1995 | Such | |
| 5,699,547 A | 12/1997 | Sato et al. | |
| 6,252,970 B1 | 6/2001 | Poon et al. | |
| 6,385,325 B1 | 5/2002 | Nageno et al. | |
| 6,456,721 B1 * | 9/2002 | Fukuda | 381/380 |

(Continued)

FOREIGN PATENT DOCUMENTS

| | | |
|---|---|---|
| CN | 1189080 A | 7/1998 |
| CN | 1259005 A | 7/2000 |

(Continued)

OTHER PUBLICATIONS

International Search Report; PCT app. No. PCT/US06/005887; May 10, 2007; 1 page.

(Continued)

Primary Examiner — Davetta W Goins
Assistant Examiner — Phylesha Dabney
(74) Attorney, Agent, or Firm — Kilpatrick Townsend & Stockton LLP

(57) ABSTRACT

A behind-the-head mounted personal audio set that allows a mono-aural personal audio device to be worn in either a wearer's left or right ear without the need to remove or detach individual components of the personal audio sent and mount is disclosed. In a disclosed embodiment, the personal audio device has two earphone portions and the mount allows the audio device to operate in either mono or stereo modes wherein one of the earphones may be moved away from a wearer's ear when needed, such as when driving. A boom microphone is preferably pivotally secured to one of the earphone portions.

22 Claims, 10 Drawing Sheets

(56) References Cited

U.S. PATENT DOCUMENTS

| | | | |
|---|---|---|---|
| 6,603,863 | B1 | 8/2003 | Nagayoshi |
| 7,046,799 | B2 * | 5/2006 | Ma ........................... 379/433.13 |
| 7,245,737 | B2 * | 7/2007 | Amae et al. ................... 381/374 |
| 7,406,172 | B2 | 7/2008 | Amae |
| 7,940,924 | B2 * | 5/2011 | Amae ........................... 379/430 |
| 2002/0173346 | A1 | 11/2002 | Wang |
| 2003/0091209 | A1 * | 5/2003 | Ito et al. ........................ 381/379 |
| 2006/0045304 | A1 | 3/2006 | Lee et al. |
| 2006/0140435 | A1 * | 6/2006 | Sheehy et al. ................ 381/390 |
| 2009/0220118 | A1 * | 9/2009 | Meier et al. ................... 381/379 |
| 2012/0082333 | A1 * | 4/2012 | Amae ........................... 381/375 |
| 2013/0156248 | A1 * | 6/2013 | Nakajima ..................... 381/374 |

FOREIGN PATENT DOCUMENTS

| | | |
|---|---|---|
| CN | 2485885 | 4/2002 |
| DE | 439808 | 1/1927 |
| JP | 10174187 A | 6/1998 |
| WO | WO 2007/103561 A2 | 9/2007 |

OTHER PUBLICATIONS

Written Opinion of the International Searching Authority; PCT app. No. PCT/US06/005887; May 10, 2007; 3 pages.

Examination Report dated May 19, 2010 from European Patent Application No. 04819143.1, 5 pages.

International Search Report; PCT app. No. PCT/US07/06050; Feb. 15, 2008; 1 page.

Search/Examination Report dated Mar. 23, 2010 from German Patent Application No. 11-2007-000-559.9 with an English language translation, 11 pages.

International Search Report of Feb. 15, 2008 for international application No. PCT/US07/006050.

Written Opinion of Feb. 15, 2008 for international application No. PCT/US07/006050.

Search/Examination Report dated Jun. 27, 2011 from Chinese Patent Application No. 200780008176.X, 3 pages.

U.S. Appl. No. 11/716,526, filed Mar. 8, 2007, 29 pages.

Second Office Action of China State Intellectual Property Office dated Jun. 11, 2012, from Chinese Application No. 200780008176.X, 8 pages.

Translation of Chinese Office Action issued in Application No. 200780008176.X on Nov. 5, 2012, 7 pages.

First Office Action issued in Chinese Application No. 200780008176.X on Jun. 27, 2011, 8 pages.

Office Action with English Translation issued in Chinese Application No. 200780008176.X on Jun. 27, 2013, 12 pages.

Chinese Office Action with English Translation issued in Application No. 200780008176.X on Feb. 27, 2013, 13 pages.

Final Office Action issued in U.S. Appl. No. 11/914,068 issued on Mar. 28, 2013, 27 pages.

* cited by examiner

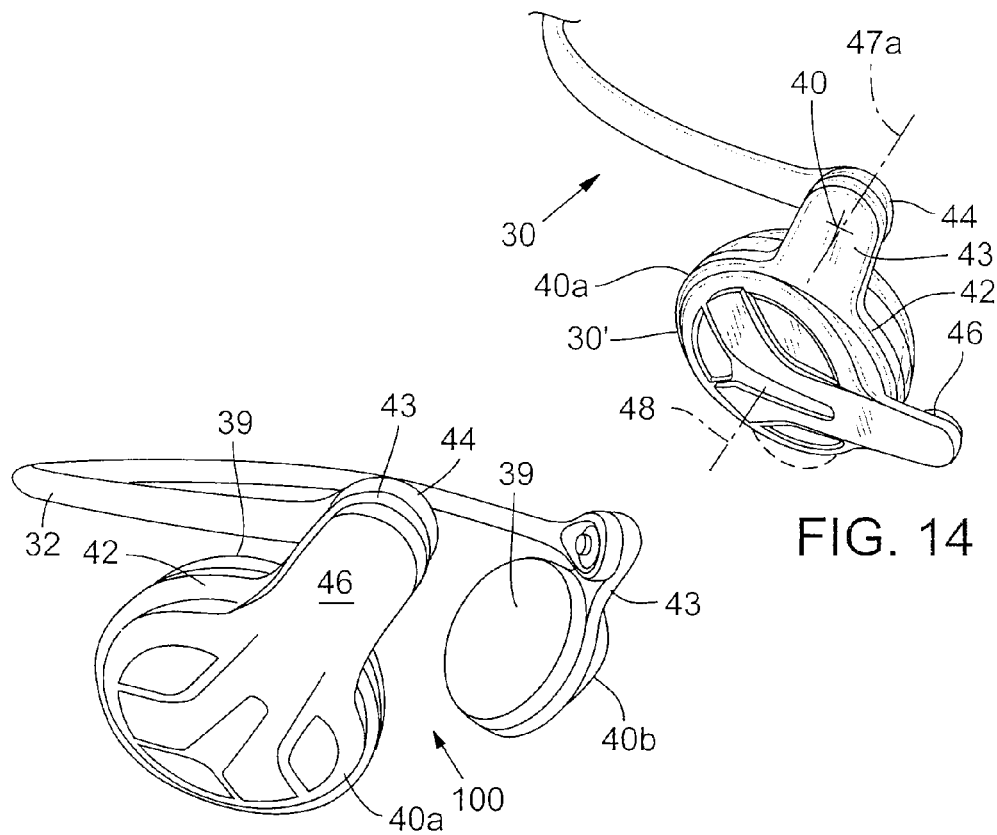
FIG. 14
FIG. 15
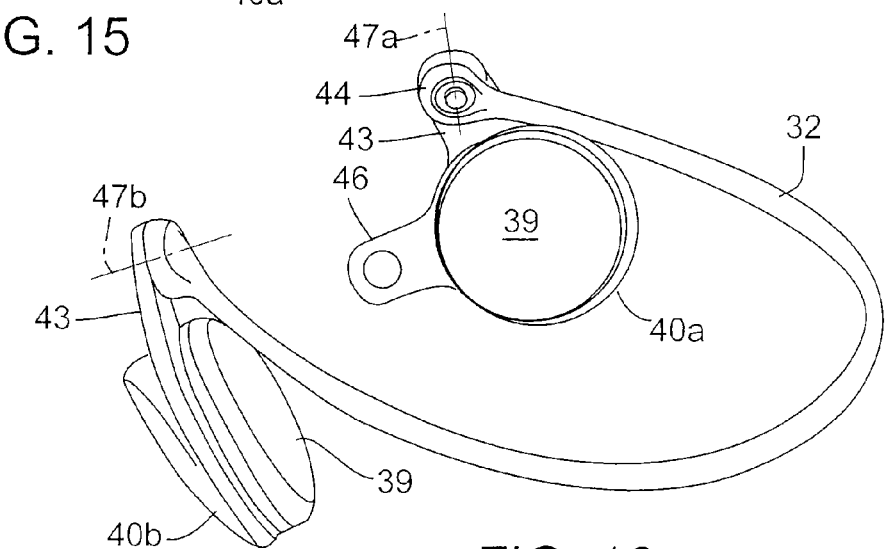
FIG. 16

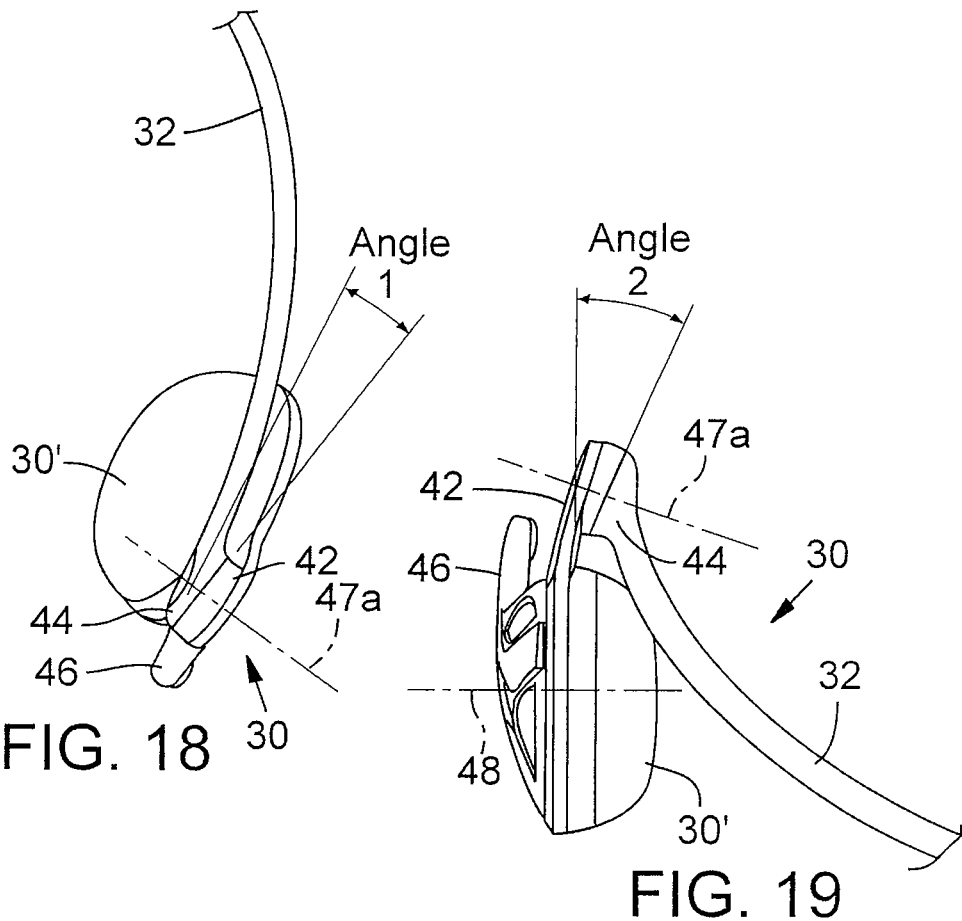
FIG. 18
FIG. 19
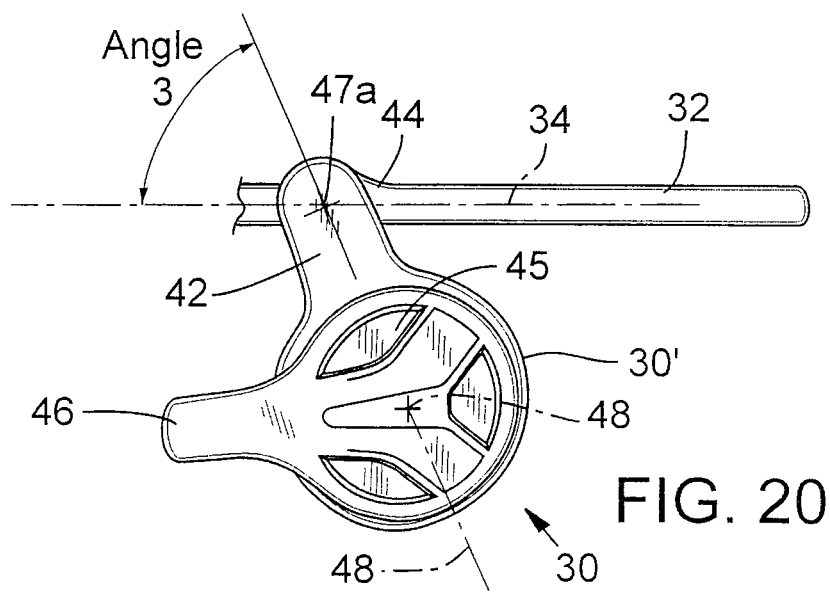
FIG. 20

REVERSIBLE BEHIND-THE-HEAD MOUNTED PERSONAL AUDIO SET WITH PIVOTING EARPHONE

CROSS-REFERENCES TO RELATED APPLICATIONS

This application is a continuation of, and claims priority from, U.S. patent application Ser. No. 12/168,768, filed Jul. 7, 2008 issued as U.S. Pat. No. 7,940,924; which is a continuation of U.S. patent application Ser. No. 11/357,933, filed Feb. 16, 2006, issued as U.S. Pat. No. 7,406,172, which claims priority to U.S. provisional patent application Ser. No. 60/653,712, filed on Feb. 16, 2005, all of which are incorporated by reference.

FIELD OF THE INVENTION

The present invention relates to a personal audio set with individually pivoting ear-phones to allow the audio set to be reversible and/or to operate either as a mono or stereo system.

BACKGROUND OF THE INVENTION

Personal audio-sets, commonly known as headphones, ear-phones, headsets, and the like, are gaining in popularity. The typical personal audio-set includes a frame containing an earphone that is usually positioned over or in a wearer's ear. In cases where the audio-set is a headset, a microphone is also typically positioned near the wear mouth.

One method for detachably securing a personal audio-set to a wearer includes securing the personal audio-set to a headband that encircles the rear portion of the wearer's head. These types of mounting structures are commonly known as "behind-the-head" mounts.

Known behind-the-head mounts have several drawbacks. For example, in cases where they are used with a mono-aural personal audio set or the like, they do not allow a wearer to easily reverse the orientation of the personal audio set such that it may be worn adjacent to either the wearer's left or right ears. This type of reversibility is a desirable characteristic in a personal audio set.

Known behind-the-head mounts for personal audio sets usually require the wearer to detach one or more pieces from the mounting structure and then reattach in a different orientation or location along the mount. In practice, such reversible behind-the-head mounts are difficult to use correctly and tend to wear prematurely due to repeated detaching and reattaching of the mount components. Moreover, individual pieces of the detachable structure are prone to being misplaced or lost, thereby limiting the use of the structure or in some cases rendering the structure useless.

Also, in cases where the personal audio set operates in stereo, ear phones usually cover both of the wearer's ears. Such covering of both ears is undesirable in some circumstances, such as when the wearer is driving. Moreover, covering both ears with a personal audio set may even violate local or state laws when driving.

BRIEF SUMMARY OF THE INVENTION

Accordingly, despite the available behind-the-head mounts for personal audio sets, there remains a need for a light weight, stylish, durable, and economical, mount that allows a mono-aural personal audio device to be worn in either a wear's left or right ear without the need to remove or detach individual components of the personal audio sent and mount.

There also remains a need that allows a personal audio device having two earphones to operate in either mono or stereo modes wherein one of the phones may be moved away from a wearer's ear when needed, such as when driving. In addition to other benefits that will become apparent in the following disclosure, the present invention fulfills these needs.

BRIEF DESCRIPTION OF THE DRAWINGS

FIG. 14 in an enlarged view of the boom microphone of FIG. 3 showing the possible operational position of the boom microphone.

FIG. 15 is an left, perspective view of the behind-the-head personal audio set of FIG. 1 showing the possible concealed position of the boom microphone of the left side.

FIG. 16 is a back, right, perspective view of the behind-the-head mounted personal audio set of FIG. 15 with the boom microphone positioned as shown in FIG. 14.

FIG. 18 is an enlarged top view of the left earphone of the behind-the-head mounted personal audio set of FIG. 1.

FIG. 19 is an enlarged rear view of the left earphone of FIG. 18.

FIG. 20 is a right, side view of the left earphone of FIG. 18.

DETAILED DESCRIPTION OF THE INVENTION

A behind-the-head mounted personal audio set 30 having two earphone portions 40*a*, 40*b*, each independently pivotally secured to a behind-the-head headband 32, is shown in FIGS. 1-20.

Figure 1:
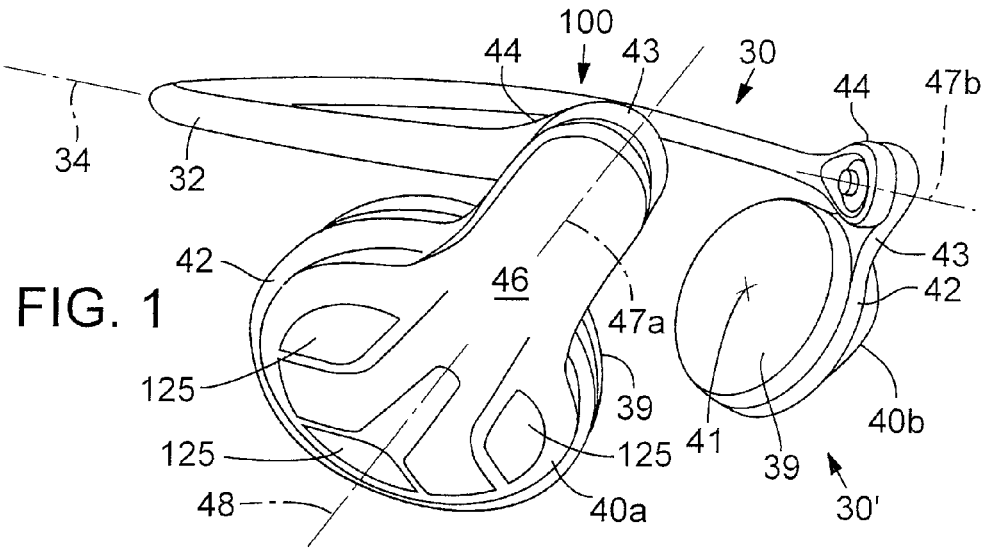
FIG. 1 is a front, left, perspective view of a behind-the-head mounted personal audio set having individually pivoting headphones operably secured thereto and a boom microphone pivotally secured to one of the headphone assemblies showing a possible concealed position of the boom microphone in accordance with an embodiment of the present invention.
Figure 2:
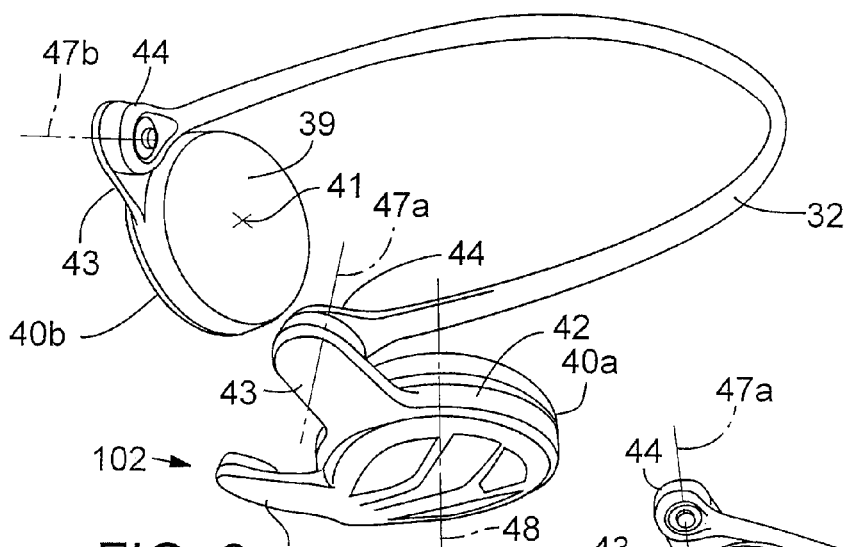
FIG. 2 is a right, perspective view of the of the behind-the-head mounted personal audio set of FIG. 1 showing a possible orientation of the boom microphone on the right side of the headset and a possible operational position of the boom microphone.
Figure 3:
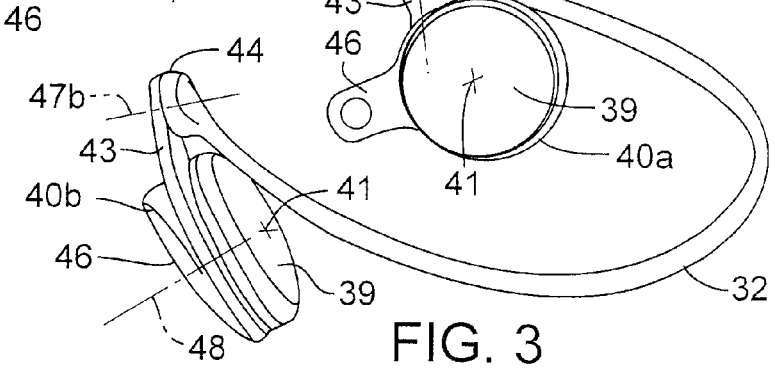
FIG. 3 is a rear, right, perspective view of the behind-the-head mounted personal audio set of FIG. 1 showing a possible orientation of the boom microphone on the right side of the headset with the boom microphone in the operational position.

In a preferred embodiment, the behind-the head mounted personal audio set 30 has a curved headband 32, preferably occupying a common plane 34 as best shown in FIG. 1. As best shown in FIGS. 4, 5, and 7-11, the headband 32 is preferably sized to encircle and slightly grasp the rear contour of a wearer's head 36 substantially between the wearer's ears 38*a*, 38*b*.

As shown in FIGS. 1-6, the earphone portions 40*a*, 40*b* are preferably positioned on opposite ends of the headband 32 at individual pivots 47*a*, 47*b*. Each pivot 47*a*, 47*b* operably secures an earphone-mounting portion 42 which as a substantially elongate pivot mounting portion 43 extending therefrom to operably engage the pivot, each earphone-mounting portion contains an earphone 39 therein. Preferably, the center 41 of each earphone 39 is positioned below the common plane 34 of the headband during stereo use of the personal audio set.

More preferably, the personal audio set 30 is a headset 30' having a miniboom microphone 46 extending therefrom. The mini-boom microphone 46 is preferably pivotally secured to the headset-mounting portion 42 at a defined third pivot 48. The length of the boom portion of the mini-boom microphone is preferably sized to define a concealed position 100 as best shown in FIGS. 1 & 15 when aligned with the substantially elongate pivot mounting portion 43. The mini-boom microphone may be pivoted about the third pivot 48 to define an operational position 102 of the mini-boom microphone as best shown in FIGS. 25, 7, 8, 12-14 and 16-20.

Figure 4:
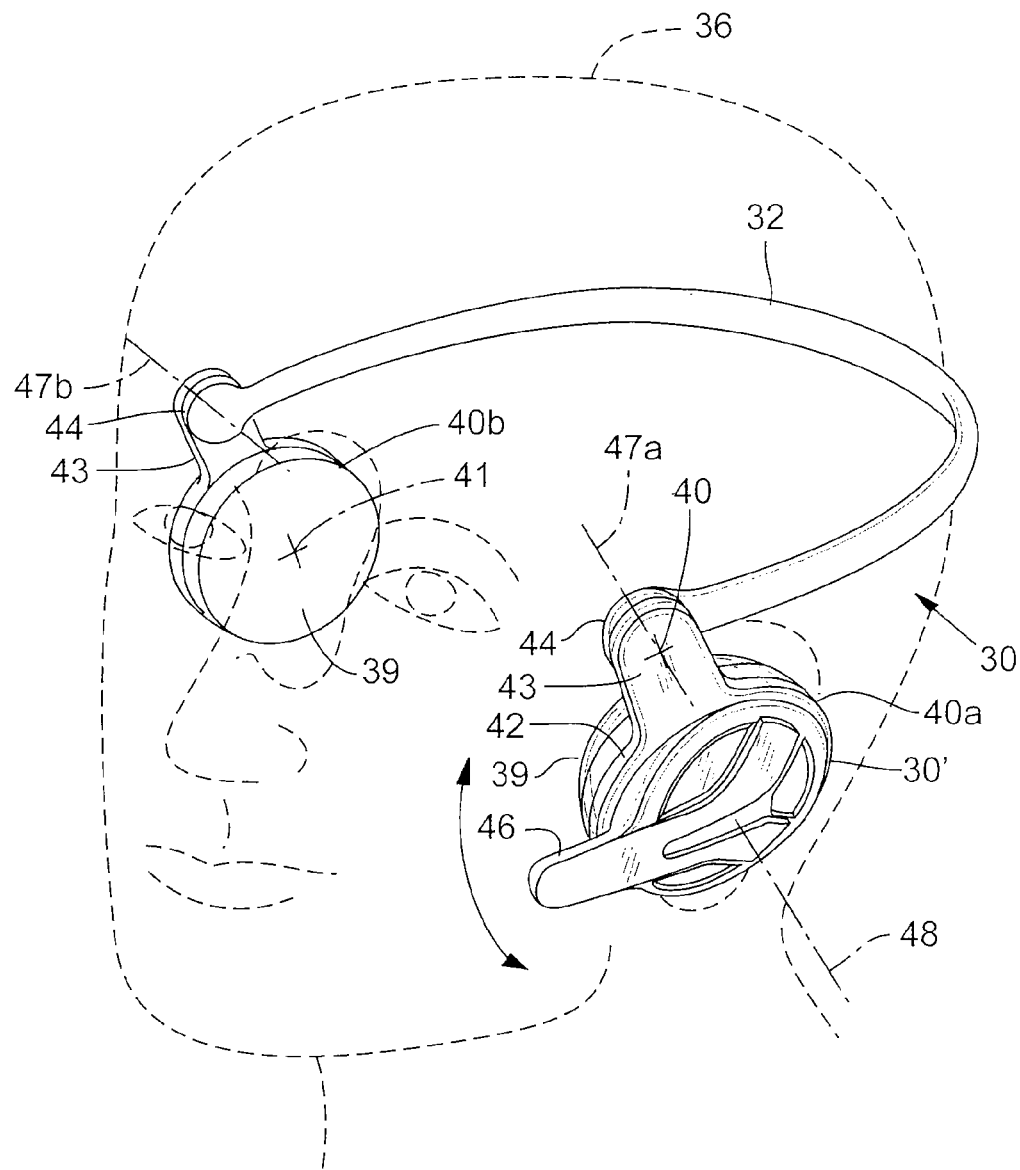
FIG. 4 is a front, right perspective view of the behind-the-head mounted personal audio set of FIG. 1 in the configuration of FIG. 2 showing a possible mounting on a wearer shown in hidden lines.
Figure 5:
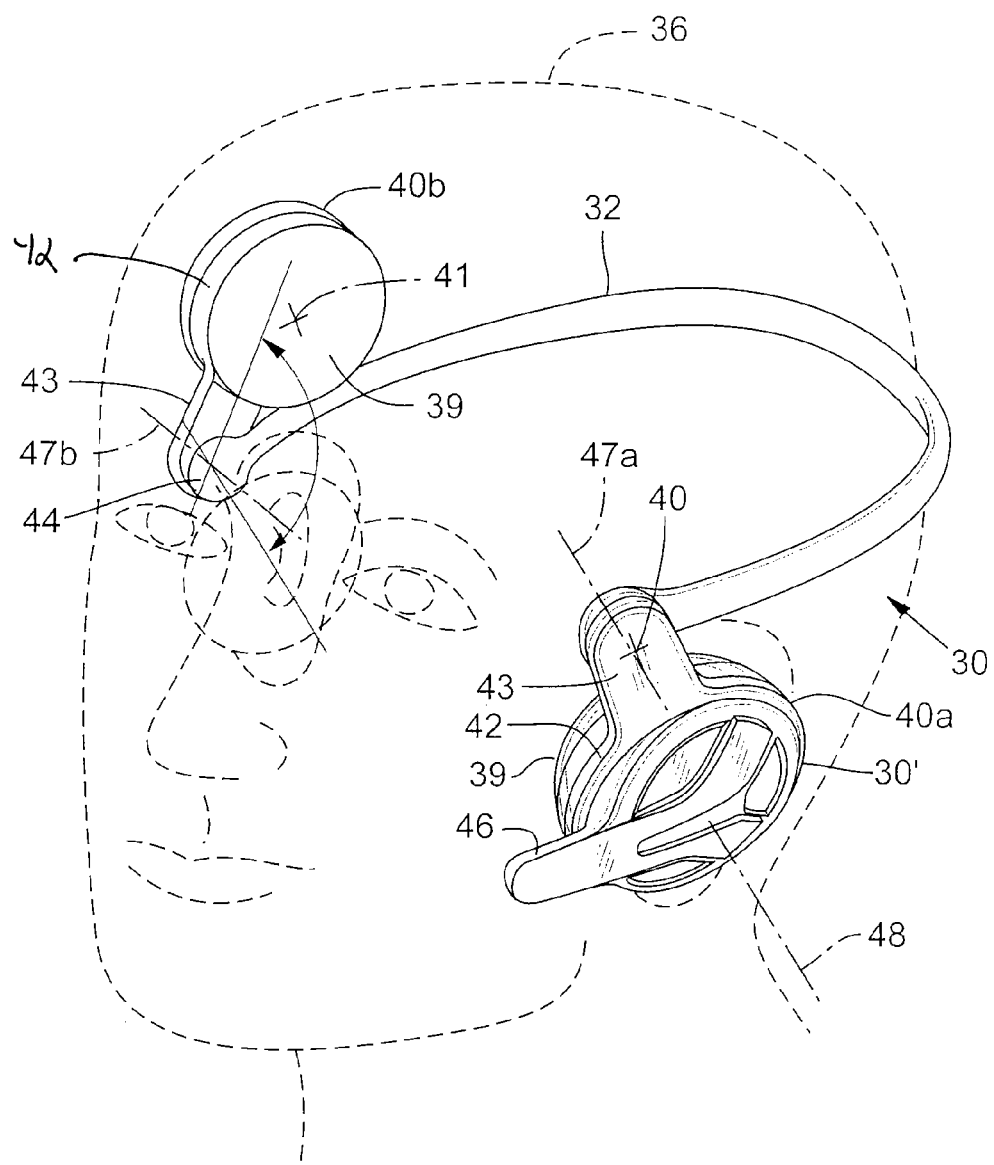
FIG. 5 is a front, right, perspective view of the behind-the-head mounted personal audio set of FIG. 4 showing a possible position of one of the headphones so as to allow the personal audio set to operate in mono without covering one of the wearer's ears.
Figure 7:
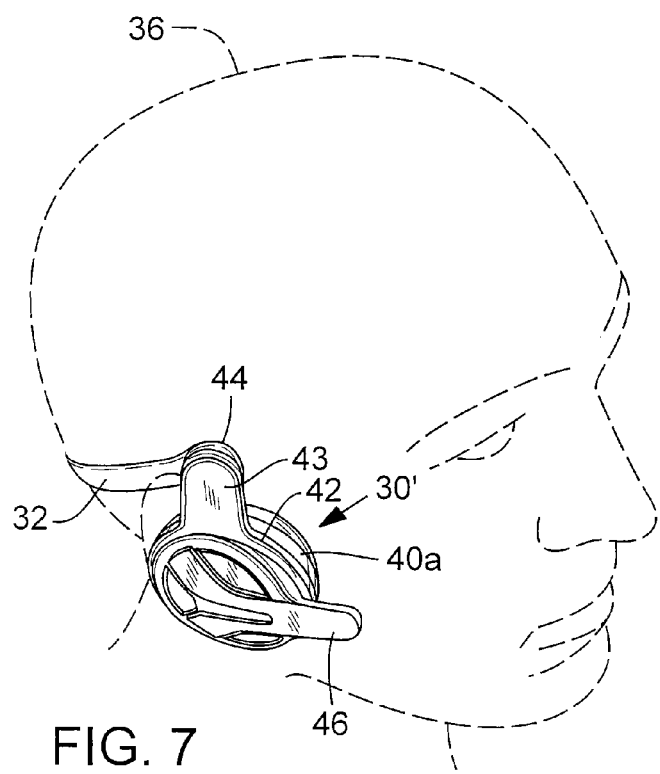
FIG. 7 is a front, left, perspective view of the behind-the-head mounted personal audio set of FIG. 1, showing a possible orientation with the boom microphone positioned on the wearer's right side.
Figure 8:
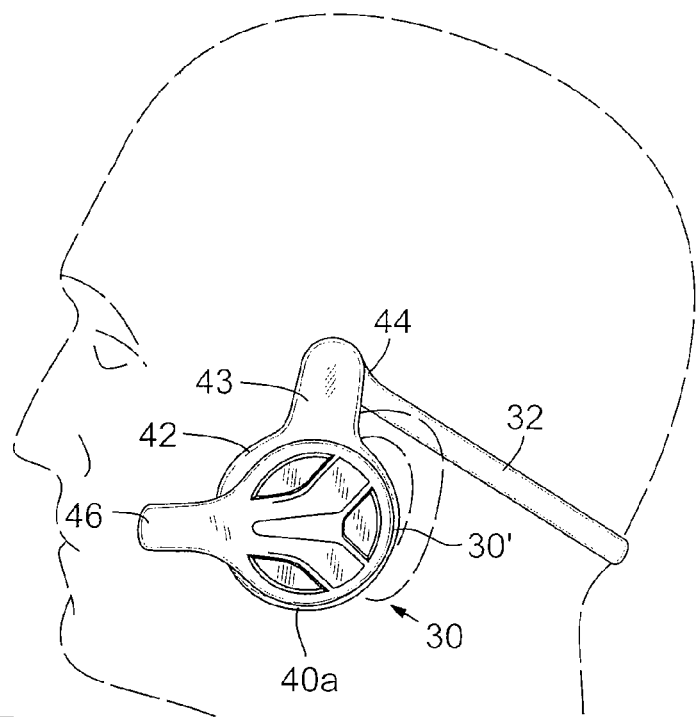
FIG. 8 is a right side view of the behind-the-head mounted personal audio set of FIG. 1, in a second possible stereo configuration with the boom microphone positioned on the wearer's left side.

By pivoting the earphone mounting portions 42 about their respective pivots and the mini-boom microphone about the third pivot 48, the headset may be worn so that each earphone is positioned over one of the wearer's ears with the mini-boom microphone 46 positioned on either the wearer's left side as shown in FIGS. 4, 5 and 8, or a wearer's right side as shown in FIG. 7.

Figure 9:
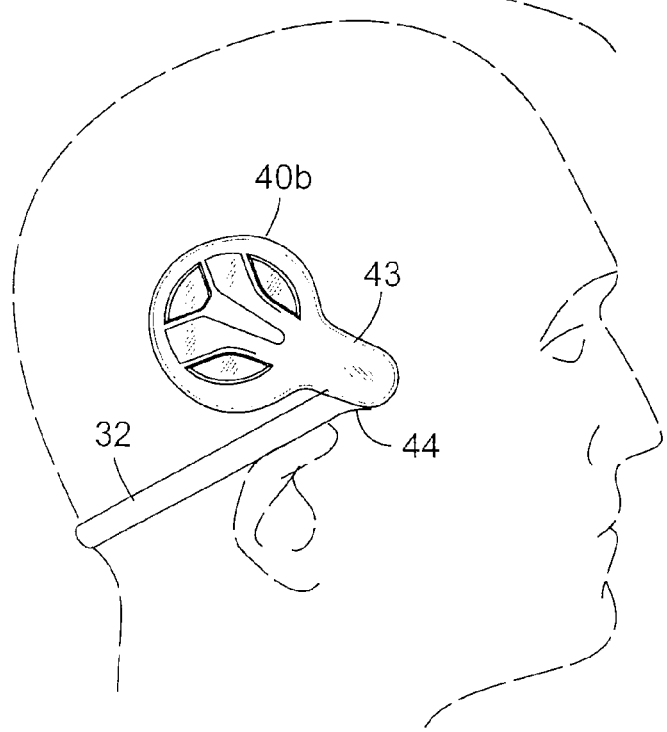
FIG. 9 is a right side view of the behind-the-head mounted personal audio set of FIG. 1, in a first possible mono configuration showing the earphone adjacent to the wearer's right ear pivoted so as to not cover the wearer's right ear.

In addition, should the user desire or require using the personal audio-set in mono mode, and not have one of the earphone portions 40*b* cover an ear, as shown in FIG. 5, the user can pivot one of the earphone mounting portions 42 about its respective pivot 47*b* so that that earphone portion rests away from the respective ear. For example, one possible mono configuration is shown in FIGS. 8 and 9 shows one earphone portion 40*a* positioned over the wearer's right ear with the earphone mounting portion 42 containing the boom microphone 46 pivoted to its engaged position (FIG. 8) while the other earphone portion 40*b* is pivoted away from the wearer's left ear (FIG. 9). It can be appreciated that the disclosed structure can also be pivoted about its three pivots to provide the same basic configurations while covering the right ear with an earphone and preventing the left ear from being covered with an earphone.

Figure 10:
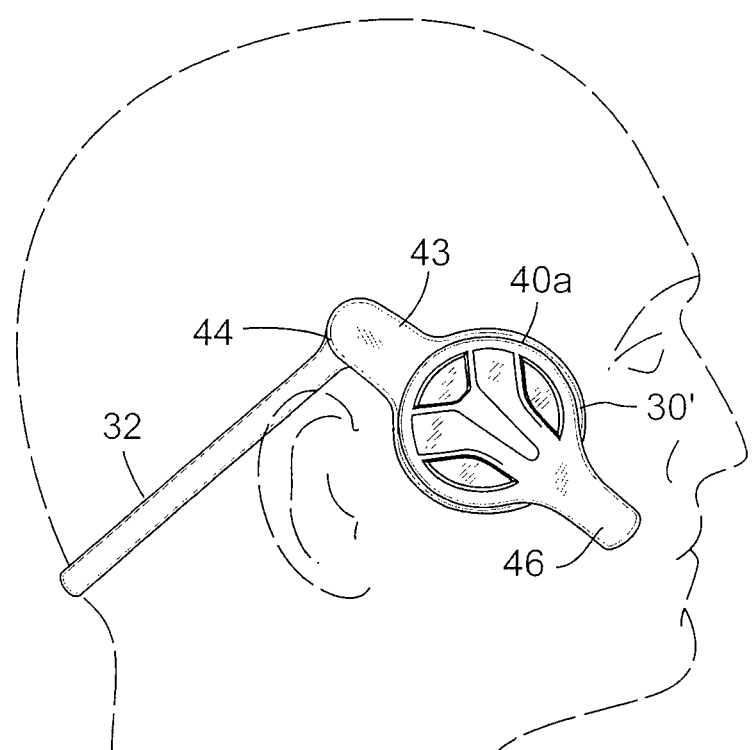
FIG. 10 is a right side view of the behind-the-head mounted personal audio set of FIG. 1 with the earphone adjacent to the wearer's right ear pivoted so as to not cover the wearer's right ear, and with the boom microphone pivoted into an operational position adjacent to the wearer's mouth.
Figure 11:
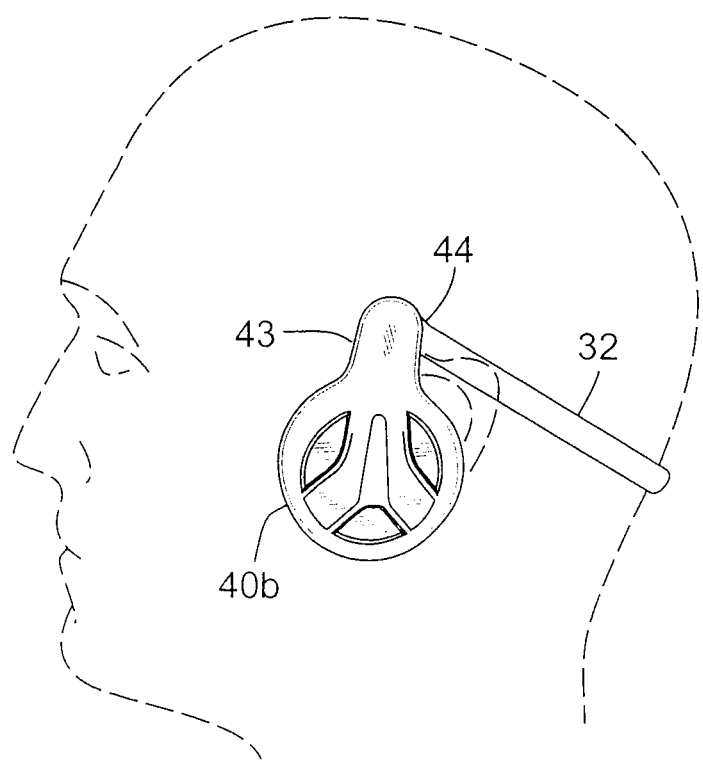
FIG. 11 is a right side view of the behind-the-head mounted personal audio set of FIG. 1 showing a possible orientation on a wearer's left ear.
Figure 12:
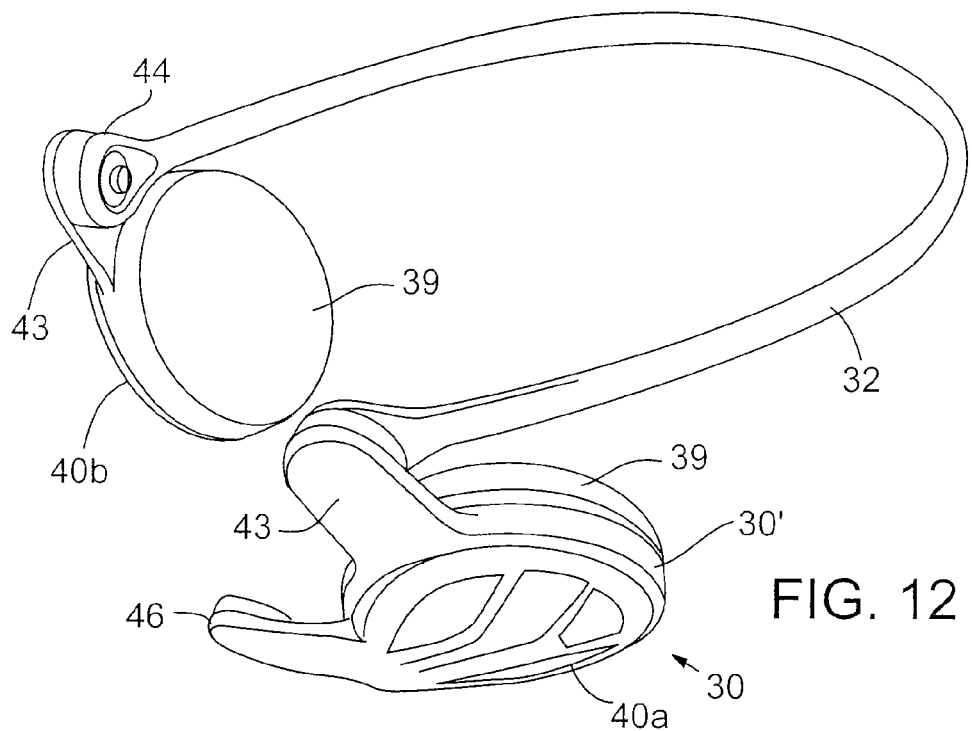
FIG. 12 is a top, right, perspective view of the behind-the-head mounted personal audio set of FIG. 1, showing a possible pivoted position of the boom microphone.
Figure 13:
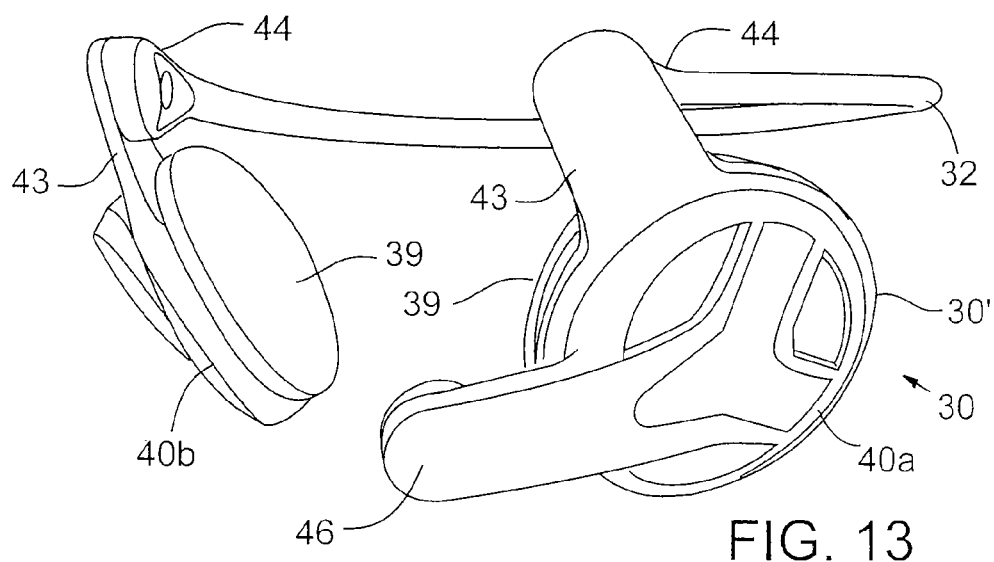
FIG. 13 is a front, right, perspective view of the behind-the-head mounted personal audio set of FIG. 12.
Figure 17:
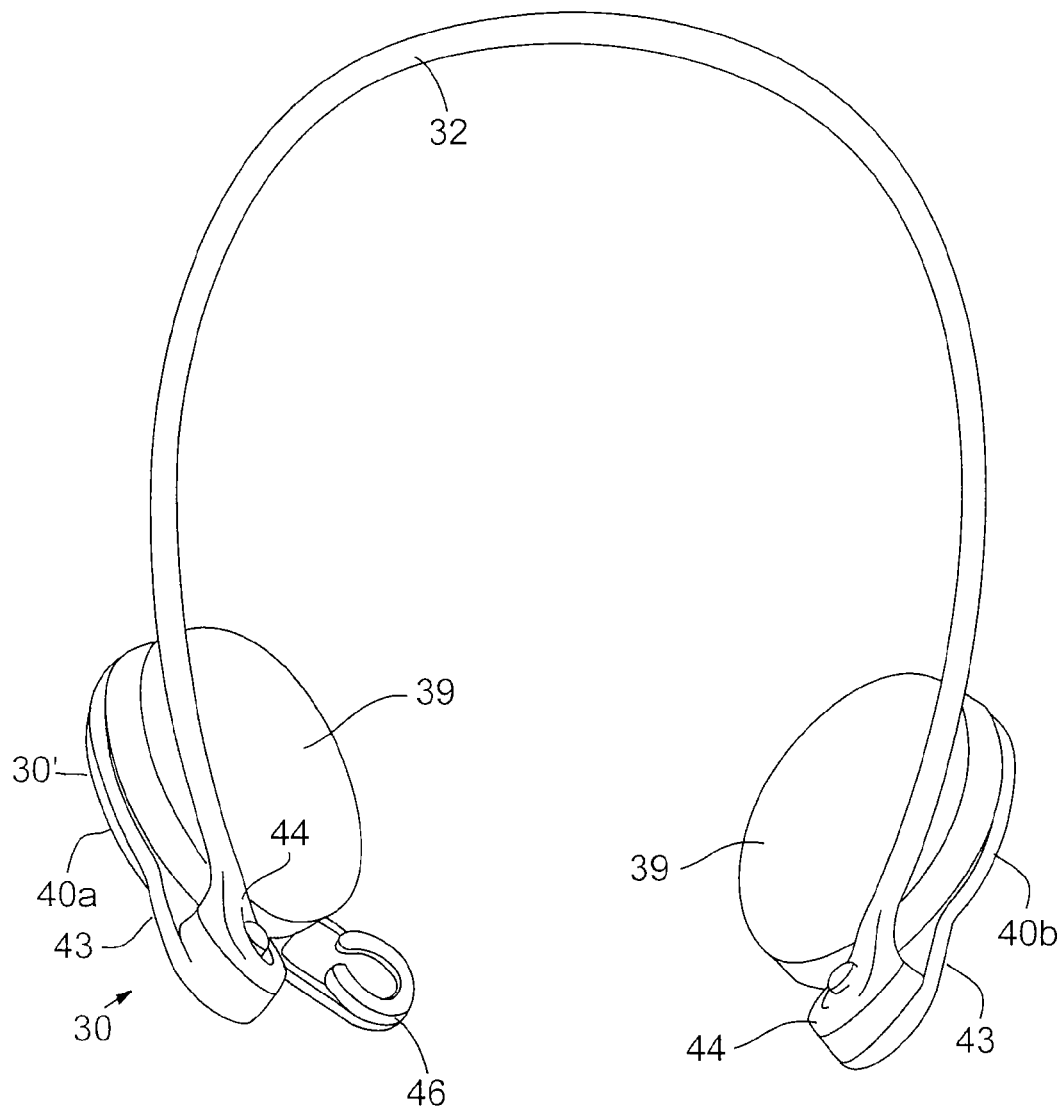
FIG. 17 us a top view of the behind-the-head mounted personal audio set of FIG. 1 with the boom microphone positioned on the left side and as shown in FIG. 14.

An alternative possible mono configuration is shown in FIGS. 10 and 11 with one earphone portion 40*a* moved forward of the wearer's left ear with the boom microphone 46 extending there from towards the wearer's mouth as shown in FIG. 10 and the opposite earphone portion 40*b* covering the wearer's right ear as shown in FIG. 11. It can be appreciated that the disclosed structure can also be pivoted about its three pivots to provide the same basic configurations while covering the left ear with an earphone and preventing the right ear from being covered with an earphone.

Preferably, the earphone portion 40*a* positioned nearest to the mini-boom microphone 46 is displaced from the wearer's ear during mono use as best shown in FIG. 10. However, the disclosed structure also allows a user to position the earphone furthest away from the mini-boom microphone away from the user's ear during mono use as shown in FIG. 5.

Preferably, the first and second pivots 47*a*, 47*b* are aligned along a defined three dimensional angle with respect to the headband 32 so as to optimize wearer comfort. This defined angle is shown as three two-dimensional angles in FIGS. 18-20 and labeled "angle 1" (FIG. 18), "angle 2" (FIG. 19), and "angle 3" (FIG. 20). Preferably, "angle 1", which biases the position of the earphone portion of the audio set to fit the angle of a human ear when viewed from the top of the head is 12 degrees plus or minus 10 degrees. "Angle 2" (FIG. 19), which is the angle between the intersection of the first pivot 47*a* and the second pivot 48, is preferably 25 degrees plus or minus 20 degrees and "angle 3", which is the angle between the common plane 34 of the headband 32 and the longitudinal centerline 45 of the headset mounting portion 42, is preferably about 60 degrees plus or minus 30 degrees. More preferably, "angle 3" is about 63 degrees.

More preferably, the first and second pivots 47*a*. 47*b* includes a detent mechanism 60 to allow proper alignment when the audio set 30 is positioned for wearing adjacent to either a wearer's left or right ears. Preferably, four detents are provided, one for the left ear position shown in FIG. 4, one for the right ear position shown in FIG. 7, one for the first desired mono position shown in FIG. 10, and one for the second desired mono position shown in FIG. 9.

Figure 6:
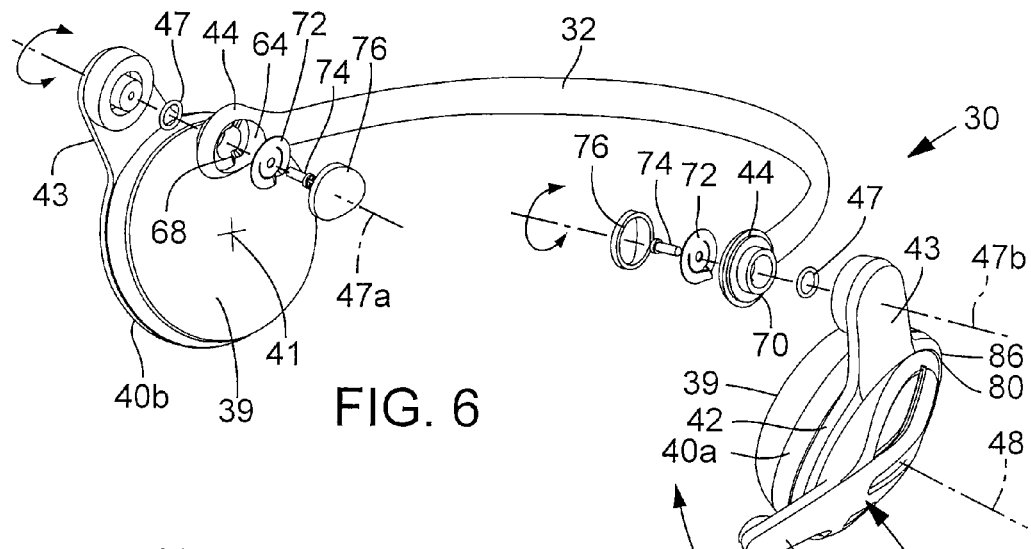
FIG. 6 is a right, perspective, partially exploded view of the behind-the head mounted personal audio set of FIG. 2.

One possible pivot structure for the first and second pivot 47*a*, 47*b* is shown in FIG. 6. The opposite ends 44 of the headband 32 each include a recess 62 defining a cam surface 64. Recesses 66 are placed at defined positions along the cam surface 64 to define the detent positions. The headset mounting portion 42 includes a circular recess 68 sized to rotate about a circular protrusion 70 extending from the first end 44 of the headband 32. Preferably, a resilient o-ring 47 is positioned between the circular recess 68 and the circular protrusion 70 to create frictional holding force. A detent spring 72 is positioned within the recess 62 and secured to the headset mounting portion 42 with a fastener 74. Preferably the detent spring 72 is sized to engage the recesses 66 in the cam surface 64 thereby urging the headset mounting portion 42 to one of the defined detents. More preferably, a cover 76 covers the fastener 74 and detent spring 72.

A possible pivot structure for the third pivot 48 is shown in FIG. 6. The headset mounting portion 42 includes a substantially circular opening 80 about which the mini-boom microphone is pivotally secured thereto. The headset mounting portion 42 preferably includes operating electronics therein. Preferably, an o-ring 86 is positioned within the circular opening 80 to hold a desired position of the mini-boom microphone. The personal audio set may be wired or wireless.

If desired, the electronics can contain suitable electronic control systems and control logic to deactivate the earphone not positioned adjacent to a wearer's ear during mono-use. This deactivation can be manually activated through a control button or the like positioned on the personal audio-set, or automatically detected by the control system based on predetermined criteria such as the position of the earphone mounting portions relative to the predetermined detents on the pivots. Alternatively, the control system can deactivate one earphone during use of the mini-boom microphone such as when a user is initially listening to music from one source, and then receives a phone call from another source.

Preferably, controls 125 in communication with the electronics, such as volume control, channel selection, on/off and the like are provided on an exterior surface of one of the earphone mounting portions. More preferably, these controls are positioned so as to allow them to be substantially at the same locations relative to the earphone mounting portion when that earphone mounting portion is worn on either the wearer's left or right ears. For example, the primary control is preferably a button positioned on the centerline of the earphone.

Having described and illustrated the principles of our invention with reference to a preferred embodiment thereof, it will be apparent that the invention can be modified in arrangement and detail without departing from such principles. In view of the many possible embodiments to which the principles may be put, it should be recognized that the detailed embodiment is illustrative only and should not be taken as limiting the scope of our invention. Accordingly, we claim as our invention all such modifications as may come within the scope and spirit of the following claims and equivalents thereto.

What is claimed is:

1. A personal audio set comprising:
   a substantially elongate headband portion defining a longitudinal center line;
   a first earphone portion pivotally secured to the headband portion at a defined first pivot;
   said first pivot operable to allow said first earphone portion to be operably positioned adjacent to one of either the wearer's left and right ears; and,
   said first earphone portion positioned substantially below the longitudinal centerline of the elongate headband when said personal audio set is worn by said one of either the wearer's left and right ears.

2. The personal audio set of claim 1, further including:
   a second earphone portion pivotally secured to the headband portion at a defined second pivot;
   said second pivot operable to allow said second earphone portion to be operably positioned adjacent to other of the wearer's left and right ears.

3. The personal audio set of claim 2, wherein said first earphone portion may be pivoted about said first pivot away from said one of said left and right ears while said second earphone portion operably covers said other of said left and right ears.

4. The personal audio set of claim 2, further including a first set of detents for operably positioning said first earphone portion about said first pivot to align said earphone with one of said left and right ears, and a second set of detents for operably positioning said first earphone portion about said first pivot away from one of said left and right ears.

5. The personal audio set of claim 4, further including a third set of detents for operably positioning said second earphone portion about said second pivot to align said second earphone with the other of said left and right ears, and a fourth set of detents for operably positioning said second earphone portion about said second pivot away from the other of said left and right ears.

6. The personal audio set of claim 1 wherein said longitudinal centerline defines a common plane, and a second angle, defined as an angle between said common plane and a second longitudinal centerline of the first earphone portion is 60 degrees plus or minus 30 degrees.

7. The personal audio set of claim 6, wherein said second angle is substantially near 63 degrees.

8. The personal audio set of claim 1 further comprising a second pivot, wherein a first angle, defined as an angle between the intersection of said first pivot and said second pivot, is 25 degrees plus or minus 20 degrees.

9. The personal audio set of claim 8, wherein said first angle is substantially near 25 degrees.

10. The personal audio set of claim 1 wherein a third angle, defined as an angle which biases the position of said first earphone portion to fit the angle of a human ear when viewed from the top of the head, is 12 degrees plus or minus 10 degrees.

11. A personal audio set comprising:
    a substantially elongate headband portion;
    a first earphone portion pivotally secured to the headband portion at a defined first pivot;
    said first pivot operable to allow said first earphone portion to be operably positioned adjacent to one of either the wearer's left and right ears;
    said first earphone portion positioned substantially below a longitudinal centerline defined by the crown of the wearer's head when said personal audio set is worn by said one of either the wearer's left and right ears;
    a second earphone portion pivotally secured to the headband portion at a defined second pivot;
    said second pivot operable to allow said second earphone portion to be operably positioned adjacent to other of the wearer's left and right ears:
    wherein said first earphone portion may be pivoted about said first pivot away from said one of said left and right ears while said second earphone portion operably covers said other of said left and right ears; and
    an electronic control system configured to deactivate said first earphone portion when said first earphone portion is pivoted about said first pivot away from said one of said left and right ears while said second earphone portion operably covers said other of said left and right ears, wherein the electronic control system is further configured to automatically deactivate said first earphone portion based on the position of said first pivot relative to a set of predetermined detents.

12. A personal audio set comprising:
    a substantially elongate headband portion defining a longitudinal center line;
    a first earphone portion pivotally secured to the headband portion at a defined first pivot, said first earphone portion containing a boom microphone pivotally secured thereto defining a microphone pivot;
    said first pivot operable to allow said first earphone portion to be operably positioned adjacent to one of either the wearer's left and right ears; and,
    said microphone pivot positioned substantially below a longitudinal centerline of the elongate headband when said personal audio set is worn by said one of either the wearer's left and right ears, wherein a first angle, defined as an angle which biases the position of said first earphone portion to fit the angle of a human ear when viewed from the top of the head, is 12 degrees plus or minus 10 degrees.

13. The personal audio set of claim 12, further including:
a second earphone portion pivotally secured to the headband portion at a defined second pivot;
said second pivot operable to allow said second earphone portion to be operably positioned adjacent to other of the wearer's left and right ears.

14. The personal audio set of claim 13, wherein said first earphone portion may be pivoted about said first pivot away from said one of said left and right ears while said second earphone portion operably covers said other of said left and right ears.

15. The personal audio set of claim 13, further including a first set of detents for operably positioning said first earphone portion about said first pivot to align said earphone with one of said left and right ears, and a second set of detents for operably positioning said first earphone portion about said first pivot away from one of said left and right ears.

16. The personal audio set of claim 15, further including a third set of detents for operably positioning said second earphone portion about said second pivot to align said second earphone with the other of said left and right ears, and a fourth set of detents for operably position said second earphone portion about said second pivot away from the other of said left and right ears.

17. The personal audio set of claim 12, wherein said boom microphone has an engaged position wherein it operably extends toward the wearer's mouth, and a refracted position.

18. The personal audio set of claim 12, wherein said first earphone portion extends below said first pivot.

19. The personal audio set of claim 12, wherein a second angle, defined as an angle between the intersection of said first pivot and said microphone pivot, is 25 degrees plus or minus 20 degrees.

20. The personal audio set of claim 19, wherein said second angle is substantially near 25 degrees.

21. The personal audio set of claim 12 wherein said longitudinal centerline defines a common plane, and a third angle, defined as an angle between said common plane and a second longitudinal centerline of the first earphone portion is 60 degrees plus or minus 30 degrees.

22. The personal audio set of claim 21, wherein said third angle is substantially near 63 degrees.

\* \* \* \* \*